(12) United States Patent  
Justin, III

(10) Patent No.: US 8,950,096 B2  
(45) Date of Patent: Feb. 10, 2015

(54) SPORT SHIRT DISPLAY APPARATUS

(71) Applicant: Sydney Justin, III, Scottsdale, AZ (US)

(72) Inventor: Sydney Justin, III, Scottsdale, AZ (US)

(*) Notice: Subject to any disclaimer, the term of this patent is extended or adjusted under 35 U.S.C. 154(b) by 0 days.

(21) Appl. No.: 13/665,515

(22) Filed: Oct. 31, 2012

(65) Prior Publication Data

US 2013/0104433 A1  May 2, 2013

Related U.S. Application Data

(60) Provisional application No. 61/553,833, filed on Oct. 31, 2011.

(51) Int. Cl.
*A47F 3/00* (2006.01)
*A47G 1/06* (2006.01)

(52) U.S. Cl.
CPC .................................... *A47G 1/0616* (2013.01)
USPC .................. 40/800; 40/455; 40/465; 40/463; D6/303

(58) Field of Classification Search
CPC ...................................................... A47B 1/0616
USPC ........... D25/125; 223/87, 88, 84, 71; D6/315, D6/316; 40/800, 538; 211/85.3, 68; D20/31
See application file for complete search history.

(56) References Cited

U.S. PATENT DOCUMENTS

| | | | | | |
|---|---|---|---|---|---|
| 58,098 | A | * | 9/1866 | Morrill | 127/21 |
| 1,020,557 | A | * | 3/1912 | Hunter | 312/114 |
| 1,385,670 | A | * | 7/1921 | Docker et al. | 248/450 |
| 1,759,432 | A | * | 5/1930 | Brecht | 40/763 |
| D158,530 | S | * | 5/1950 | Tobin | D6/316 |
| 3,659,365 | A | * | 5/1972 | Eaton | 40/649 |
| D253,447 | S | * | 11/1979 | Tully | D6/316 |
| 4,542,838 | A | * | 9/1985 | Perez-Tubens et al. | 223/87 |
| 5,142,384 | A | * | 8/1992 | Wood et al. | 359/3 |
| 5,277,949 | A | * | 1/1994 | Green | 428/13 |
| 5,348,165 | A | * | 9/1994 | Pomerleau | 211/85.3 |
| 6,044,987 | A | * | 4/2000 | Marcus et al. | 211/169 |
| 6,158,828 | A | * | 12/2000 | Vacovsky et al. | 312/114 |
| D591,980 | S | * | 5/2009 | Brinson et al. | D6/450 |
| 7,591,097 | B2 | * | 9/2009 | Alman et al. | 40/800 |
| 8,161,673 | B1 | * | 4/2012 | Kendall et al. | 40/800 |
| D658,404 | S | * | 5/2012 | Justin, III | D6/470 |
| 2009/0250562 | A1 | * | 10/2009 | Jupitz | 248/121 |
| 2011/0271568 | A1 | * | 11/2011 | Vitale | 40/455 |
| 2012/0260551 | A1 | * | 10/2012 | Andrulewich | 40/777 |

\* cited by examiner

*Primary Examiner* — Casandra Davis

(74) *Attorney, Agent, or Firm* — Polsinelli PC; Yu Cai

(57) ABSTRACT

A display apparatus is provided for displaying a jersey with a three-dimensional view with a vision effect of floating in mid-air in an enclosed environment. The display apparatus comprises an outer casing body, a front and a back clear screen, an inner support member, an optional desk support and an opening means. In particular, when a jersey is supported by the inner support member as provided, the support member is invisible such that it contributes to the mid-air floating visual effect. The display apparatus may further comprise components to achieve visual, audio and/or video effects controlled by sensors.

12 Claims, 10 Drawing Sheets

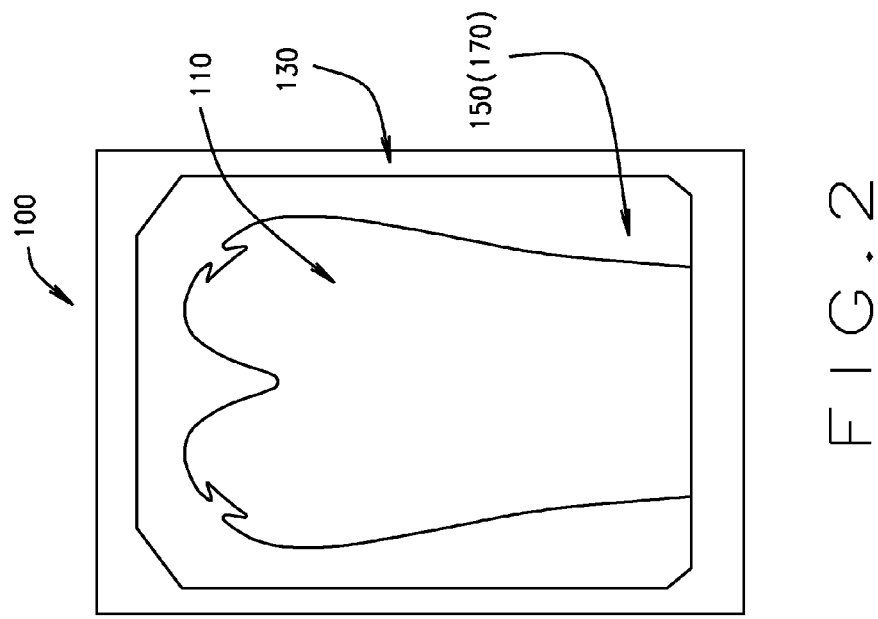
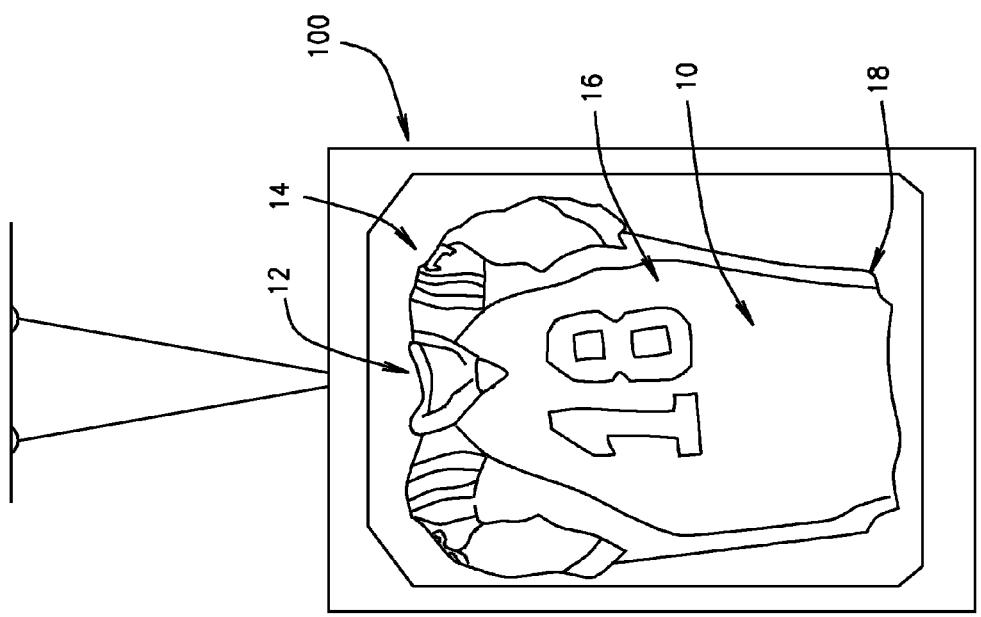

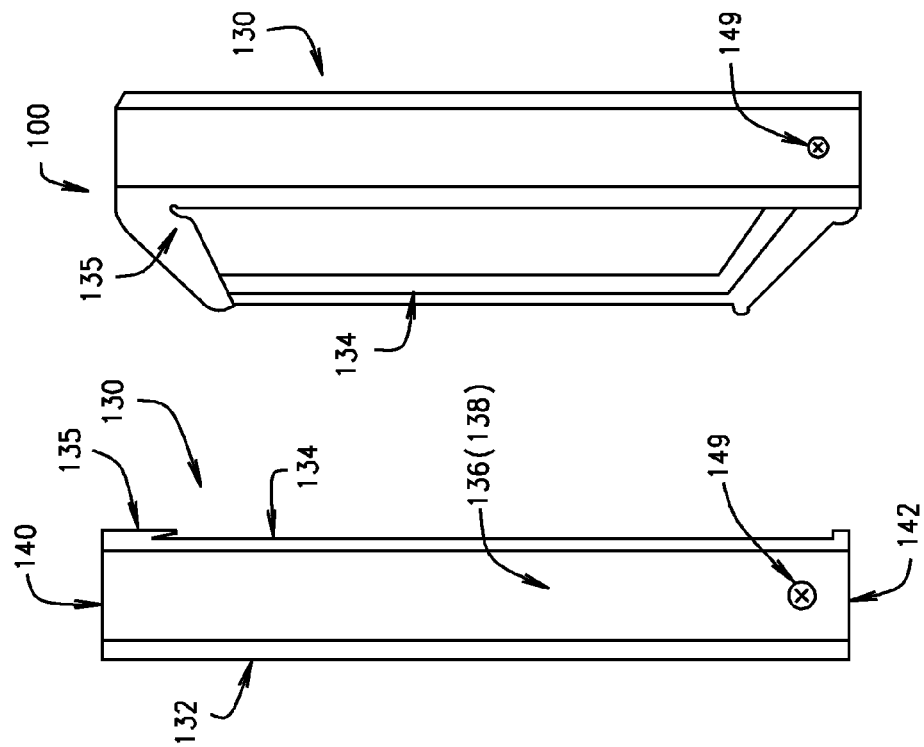
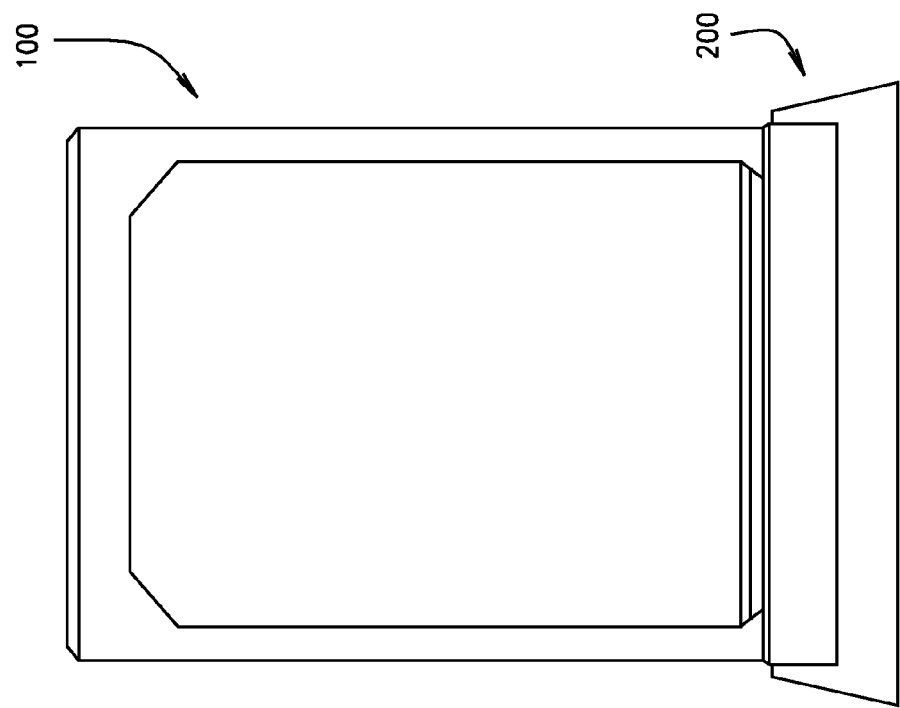

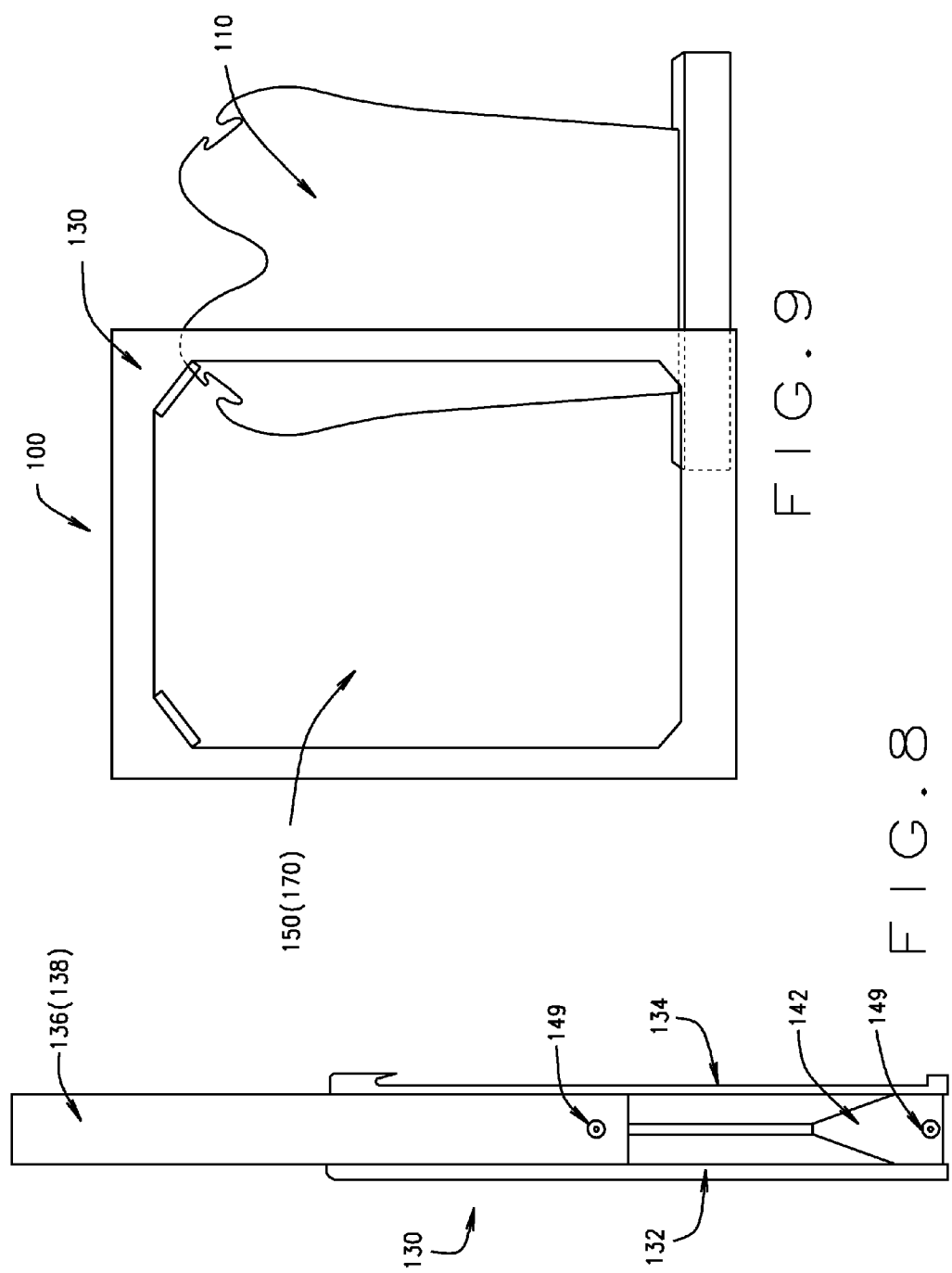

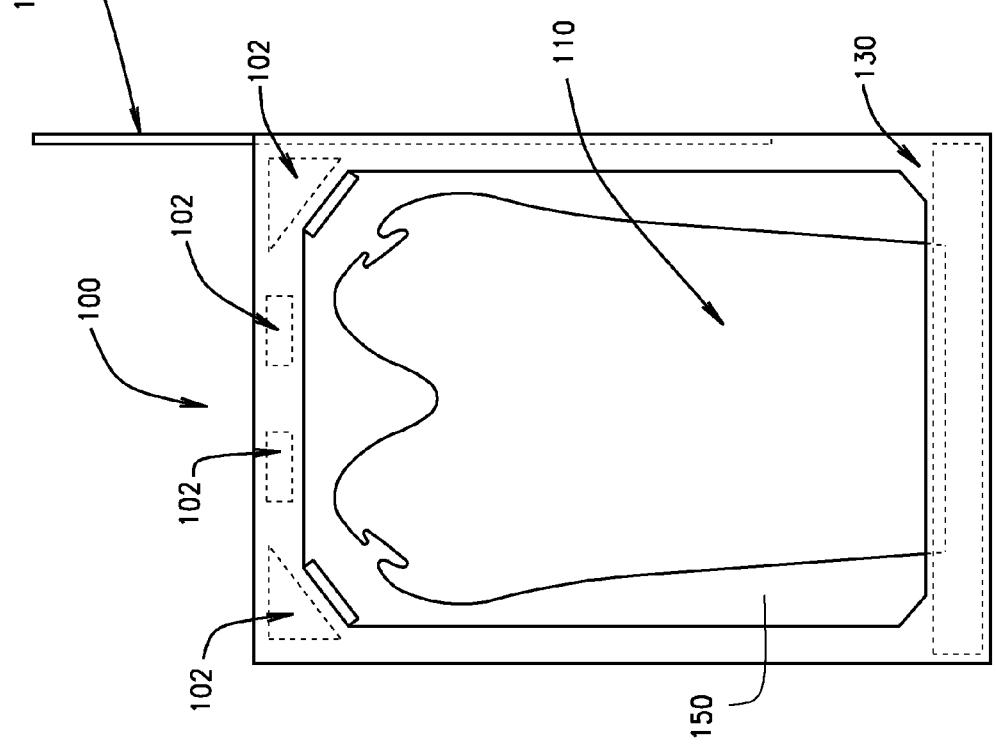
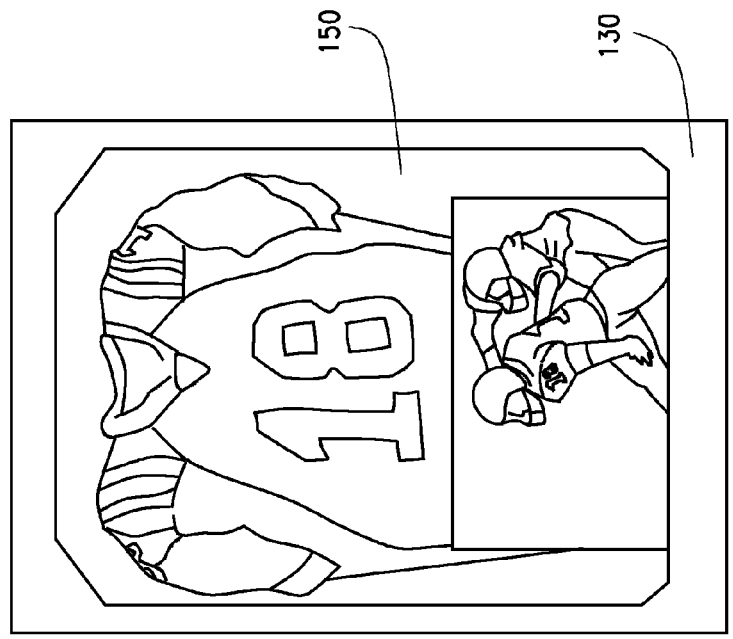

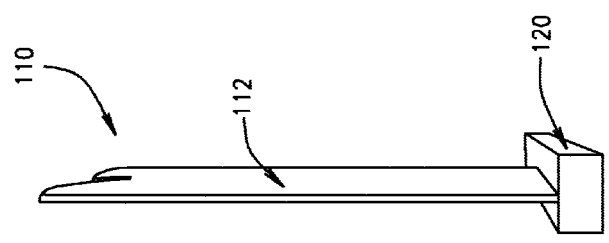
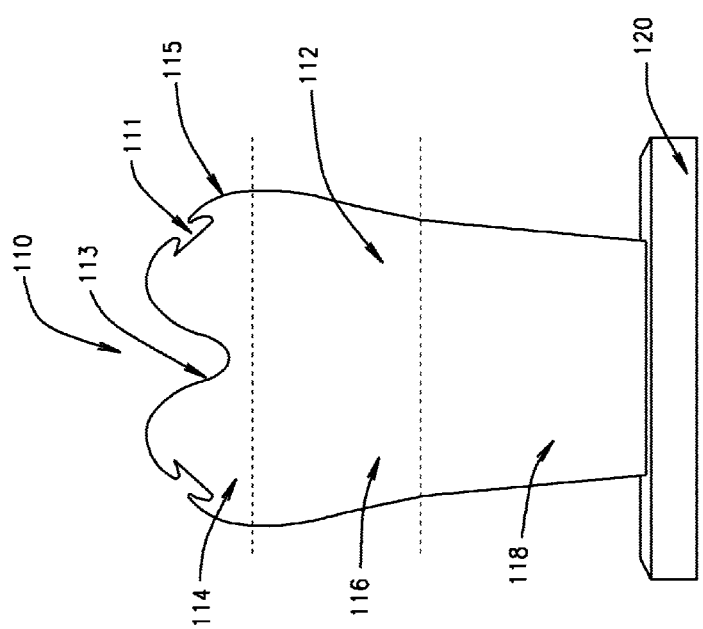

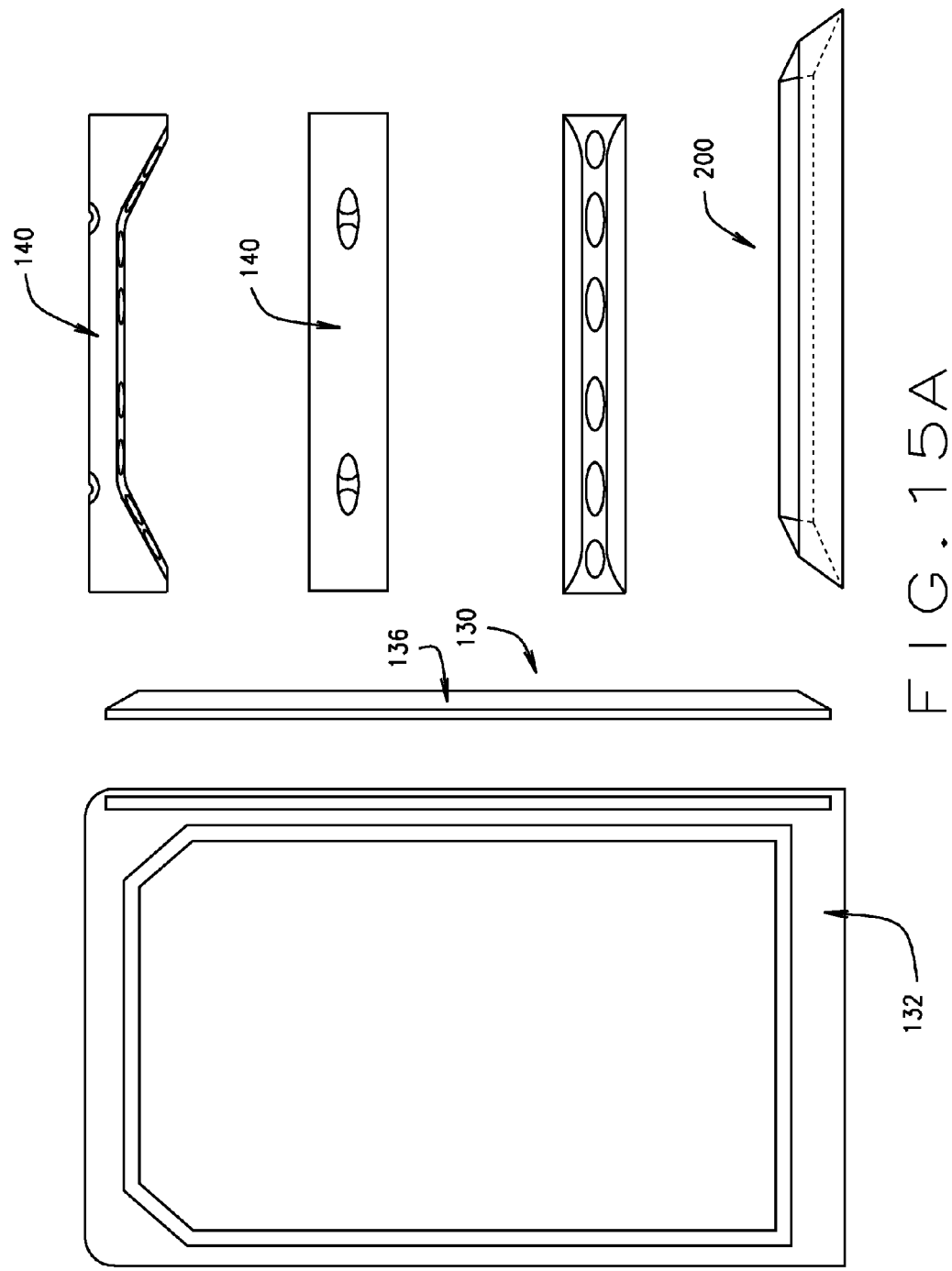

SPORT SHIRT DISPLAY APPARATUS

RELATED APPLICATIONS

This application claims the priority benefit of Application Ser. No. 61/553,833, filed on Oct. 31, 2011, the teachings and content of which are hereby incorporated by reference.

BACKGROUND OF THE INVENTION

1. Field of the Invention

The present document relates to a display apparatus, and in particular to a sport shirt display case for displaying memorabilia.

2. Description of the Prior Art

Sport shirts, and more particularly sport jerseys of a sport team uniform, are one type of memorabilia item that may be commonly displayed in a display case. Such display cases, which are also known as shadow boxes, jersey cases, jersey displays or shirt cases, etc., typically frame an athlete's sport jersey, which is then mounted on a wall or otherwise displayed for open viewing.

Generally, in most conventional display cases the sport jersey is stitched to a backing (e.g., mat board or paper-type product) or the like and is enclosed by a glass or acrylic cover of a display case. In other cases, the sport jersey is hung from a hanger. When the sport jersey is stitched to the backing of a display case, the sport jersey is firmly pressed against the backboard within the display case, so only the front of the sport jersey can be viewed. When the sport jersey is hung from a hanger, even with a custom designed hanger to fit the shoulder width of the jersey (see U.S. Pat. No. 6,158,828), creases, folding lines, and wrinkles in the part below the shoulder portion may form because the hanger only supports the shoulder and the fabric of the rest of the sport jersey droops down in the air within the case and thus can't be stretched and flattened on the surface.

In both instances, while sport jerseys and the like can be displayed, they are not displayed in an authentic or life-like manner. Also, these conventional display cases only convey limited information through the sport jersey itself. Unless a viewer is familiar with the uniform and the player who wears the number, it doesn't transport the legacies behind that sport jersey to people who have no knowledge and want to learn more about the uniform. The problem may be solved by displaying an external exhibit on paper, wooden or plastic plates. In addition, when without external lighting fixtures, conventional display cases would remain in the dark and thus hard to see. Therefore, there is a need to make a display apparatus that overcomes all aforementioned problems.

SUMMARY OF THE INVENTION

Provided herein is a display apparatus. In one embodiment, a display apparatus may include an outer casing body 130 comprising a front frame 132, a back frame 134, two side panel members 136 and 138, a top panel member 140, a bottom panel member 142; a front clear screen 150 and a back clear screen 170; wherein the front and the back clear screen is supported by the front frame and the back frame of the outer casing body, respectively; an inner support member 110 configured to support the item for display within the outer casing body 130, the inner support member 110 including a support panel 112 and an inner stand 120, wherein the support panel 112 is defined by a shoulder section 114, a middle section 116 and a torso section 118; wherein the support panel 112 is connected to the inner stand 120 by a connection means; wherein the shoulder section 114 of the support panel 112 defines a smooth round 115 outliner substantially mimicking the contour of human shoulders; wherein the shoulder section 114 further comprises a curved structure 111 configured to provide a supporting space for items having only straps or strings to attach; wherein the support panel 112 comprises a neck curve line 113 resembling a V shape; wherein the middle section 116 and torso section 118 of the support panel 112 are in an inverted trapezoidal configuration.

Additional objectives, advantages, and novel features will be set forth in the description that follows or will become apparent to those skilled in the art upon examination of the drawings and detailed description that follows.

BRIEF DESCRIPTION OF THE FIGURES

FIG. 1 is a front view of a display apparatus 100 in a hanging position;

FIG. 2 is a front view of a display apparatus 100 comprising an inner support member;

FIG. 5 is a perspective view of the display apparatus 100 inserted within the display apparatus desk support 200;

FIG. 6 is a side perspective view of the outer casing body 130;

FIG. 7 is a back perspective view of the outer casing body 130;

FIG. 8 is a side perspective view of an outer casing body 130 with a side panel member 136 or 138 sliding up (or down) between a front frame 132 and a back frame 134;

FIG. 9 is a front view of the display apparatus 100 with the outer casing body 130 in an open state with a sliding side panel member 136 or 138 removed;

FIG. 10A is a front view of the display apparatus 100 with the outer casing body 130 having internal or surface components 102 in a space between the front frame 132 and the back frame 134 of the outer casing body 130; FIG. 10B is a front view of the display apparatus 100 with a hologram screen integrated in a preselected position on the front clear screen 150.

FIG. 11 is a front perspective view of the inner support member 110;

FIG. 12 is a side perspective view of the inner support member 110;

FIG. 15A and FIG. 15B illustrate actual dimensions and sizes of the display apparatus 100 including the outer casing body 130, the front frame 132, the top panel member 140 with lighting fixtures, the display apparatus desk support 200 and the inner support member 110 that matches with the size of the display apparatus 100 as provided in FIG. 15A for exemplary purposes.

Corresponding reference characters include corresponding elements among the views of the various drawings, the headings used in the figures should not be interpreted to limit the scope of the claims.

DETAILED DESCRIPTION

Figure 3A:
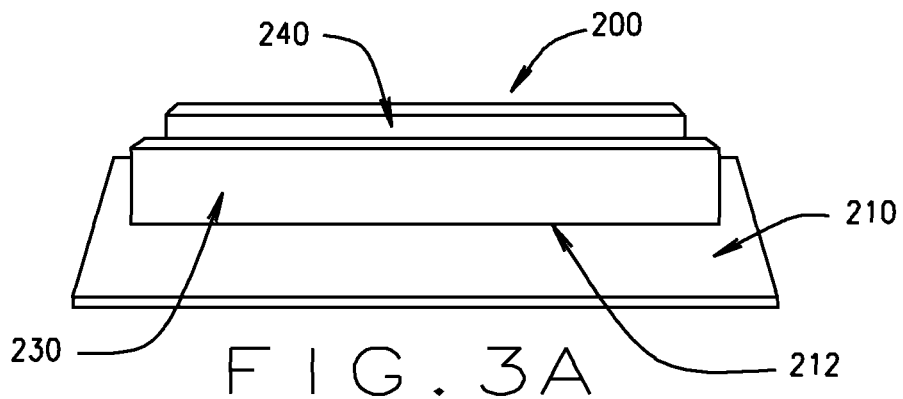
FIGS. 3A, 3B, and 3C is an optional display apparatus desk support 200.

The following description sets forth preferred materials, embodiments, and procedures in accordance with the present invention. Although any methods, embodiments, and materials similar or equivalent to those described herein can be used in the practice or testing of the present invention, the preferred methods, devices, and materials are now described. It is to be understood, however, that these are provided by way of illustration only, and nothing therein should be deemed a limitation upon the overall scope of the invention.

Referring to FIG. 1, a display apparatus 100 is illustrated in a hanging position. As shown, there is no visible hanger or support for a jersey 10 within the display apparatus 100, since the jersey 10 is fully expanded from collar portion 12, shoulder portion 14, torso portion 16 to the bottom hem 18 of the jersey. The jersey 10 is displayed in three dimensions, and provides a mid-air floating visual effect in the display apparatus 100 due to a specially designed inner support member 110 that will be discussed in greater detail below.

The display apparatus 100 is configured for displaying any type of item such as jerseys for all sports, recreation activities, clubs, and so on. For example, the display apparatus 100 can display sports jerseys for football, hockey, baseball, basketball, lacrosse, golf, jockeys, car racing drivers, etc. More particularly, as illustrated in FIG. 1, the display apparatus 100 may display a jersey to simulate the manner in which it is actually worn by the athlete. For example, a football jersey may be displayed so as to simulate the wearing of the jersey over shoulder pads. Similarly, a hockey jersey may be displayed in such a manner that it appears as if shoulder pads are actually within the jersey. Even jerseys for sports that do not have shoulder pads (baseball jerseys) can be displayed, the jersey is nonetheless displayed to simulate the jersey on a baseball player having broad shoulders. In addition, sports jerseys with no sleeves can be supported and displayed in a life-like manner. Accordingly, the display apparatus 100 presents the uniform's jersey in a life-like manner with mid-air floating visual effect.

FIG. 2 illustrates a preferred inner support member 110 capable of entirely holding, supporting, and expanding a jersey 10, an outer casing body 130, a front clear screen 150, and a back clear screen 170.

For example, the display apparatus 100 may be configured to have five or more sizes from mini, XXS, small, large, extra large or any size in between, such that a jersey 10 being displayed may be 10%, 20%, 30%, 40%, 50%, 60%, 70%, 80%, 90%, 100%, 150%, 200%, 300%, 400% or above, or any range thereof in size of a real jersey. The outer casing body 130 may be made of wood, but other suitable materials may be used as well, such as acrylic, metal, plastic or clay. The display apparatus 100 may be of any color designed to fit a decor of a household, office, bar, restaurant, gym, family dwelling, industrial building, or motor vehicle. In addition, the display apparatus 100 may be designed in various dimensions and configurations for similar applications and purposes, for example, an add-on outer protection box (not shown) with an inner jersey display apparatus disclosed herein. The front and back clear screens 150 and 170 may be made of clear acrylic, glass, plexiglass sheets, or any other material known for display purposes.

Figure 3B:
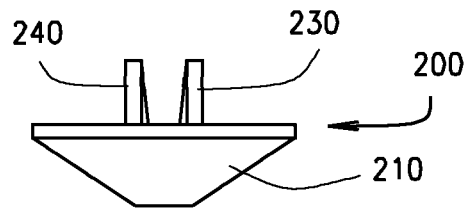
Figure 3C:
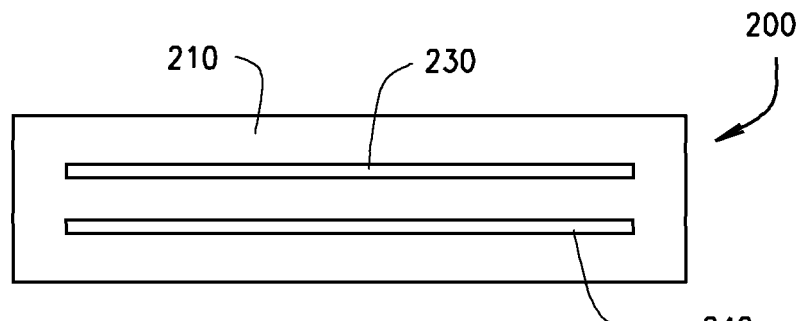

FIG. 3A illustrates an optional display apparatus desk support 200 including a base 210, and an inserting means 212 including a front piece 230 and a back piece 240. The base 210 and the front piece 230 collectively form a space, a room, a groove or an opening 250 that can hold the display apparatus 100 from the bottom. The display apparatus 100 may slide in from the side of the opening 250 to stand up with the support of the display apparatus desk support 200, or may be placed in the opening 250 by inserting the display apparatus 100 from above the opening 250. FIG. 3B is a side perspective view of the optional display apparatus desk support 200 having a base 210, a front piece 230 and a back piece 240. FIG. 3C is a top perspective view of the optional display apparatus desk support 200 including a base 210, a front piece 230 and a back piece 240.

Figure 4:
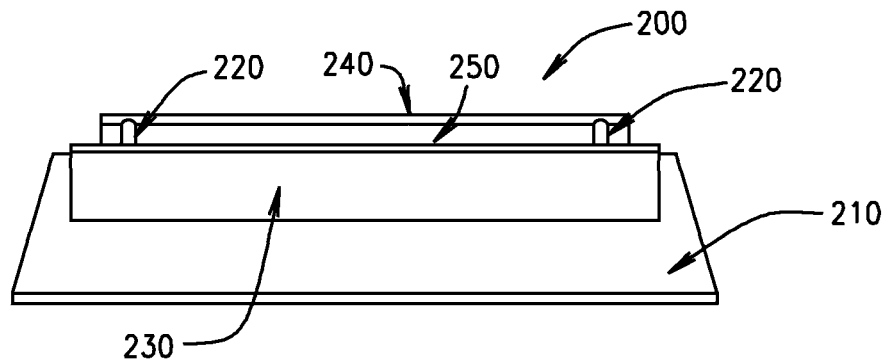
FIG. 4 is a front perspective view illustrating another embodiment of an optional display apparatus desk support 200.

FIG. 4 shows another embodiment of an optional display apparatus desk support 200 including a base 210, and an inserting means including two side pieces 220, a front piece 230 and a back piece 240. The base 210, the two side pieces 220 and the front piece 230 collectively form a space, a room, a groove or an opening 250 configured to hold the display apparatus 100 from the bottom. The display apparatus 100 may be placed in the opening 250 by inserting from above the opening 250.

FIG. 5 shows the display apparatus 100 inserted or sitting in a display apparatus desk support 200, such that the display apparatus 100 may be placed on any relatively flat surface upright to provide both a front and a back view of the jersey being displayed.

Referring to FIG. 6, an outer casing body 130 having a front frame 132, a back frame 134, two side panel members 136 and 138, a top panel member 140, a bottom panel member 142, an opening means for sliding at least one of the two side panel members 136 and 138 in or out of the outer casing body 130 to form a closed or an open configuration of the outer casing body 130, and a hanging means 135 included in the back frame 134. The side panel members 136 or 138 further include a fastening means 149 such that the sliding side panel member 136 or 138 is attached to the bottom panel member 142 of the outer casing body 130 in a closed position, when the sliding side panel member 136 or 138 is fully aligned with the front frame 132 and the back frame 134 and collectively forms a closed configuration of the outer casing body 130. The sliding side panel member 136 or 138 is attached in such a way to permit easy access to the displayed item from the side of the display apparatus 100 to arrange the item and to allow removal and replacement of the item.

FIG. 7 shows an outer casing body 130, with a back frame 134 including a hanging means 135, in one embodiment, as a ledge. In this embodiment, the ledge is an integral part of the top edge of the back frame 134, forming an inward groove capable of hooking on a vertical surface, a securing means, such as a hook, a nail, a string, a rope, for engaging the display apparatus 100 by a general hanging means. The hanging means 135 of the back frame 134 of the outer casing body 130 may be configured in any shape, size, or material. For example, hanging means 135 may be configured to a hole, a hook, a tack, a cleat, a tape, a wire, a string or any other hanging means. The fastening means 149 for attaching the sliding side panel member 136 or 138 to the bottom panel member 142 of the outer casing body 130 such that the outer casing body stays in a closed configuration. The fastening means 149 may include screws, bolts, sockets, rods, pins, anchors, nails, clips, pound-on clips, or plugs. Preferably, the fastening means 149 can be selectively released, such that the outer casing body 130 is capable of being opened or closed freely and conveniently.

FIG. 8 shows an outer casing body 130 with a side panel member 136 or 138 sliding up (or down) between the front frame 132 and the back frame 134. Those skilled in the art will understand the modification on the facing surfaces of the front frame 132 and the back frame 134, for example, to make a groove on each of the surfaces, to enable a better registration and alignment of the sliding side panel member 136 or 138 to the edges of the front frame 132 and the back frame 134, and facilitate a smooth movement for the sliding side panel member 136 or 138 in motion.

FIG. 9 shows a display apparatus 100 with a outer casing body 130 in an open configuration with a sliding side panel member 136 or 138 removed, and the inner support member 110 for holding, supporting and expanding a jersey 10 is being placed in (or taken out of) the display apparatus 100.

FIG. 10A shows a display apparatus 100 with an outer casing body 130 in a half open (or closed) configuration with the sliding side panel member 136 or 138 sliding up (or down), and the inner support member 110 for holding, supporting and expanding a jersey 10 being placed within the display apparatus 100. FIG. 10 further shows an outer casing body 130 of the display apparatus 100 further comprising internal or surface components 102 in a space defined between a front frame 132 and a back frame 134 of the outer casing body 130. For illustration purposes, the internal or surface components 102 may be lighting fixtures with beams shining onto the displayed jersey, voice chip with recordings of a voice that provides comments about the displayed items or greets a viewer, a hologram screen for displaying a video of a player's action highlights, motion sensors controlling the lighting fixation, a voice chip or video, and battery packs or any energy sources to power the sensor systems and visual, audio or video components. In one embodiment, the hologram screen is integrated in a preselected position on the front clear screen 150, such that the hologram screen is hardly visible when no video is being played, and that the jersey positioned behind the front clear screen 150 is fully displayed without any blockage when no video is played (FIG. 10B). In another embodiment, a small camera for projection purposes may be disposed in the space at the bottom and inside of the outer casing body 130 such that the video projection may be displayed onto the inside of the front clear screen 150, which is preferably made of plexiglass. The space defined at the bottom and inside of the outer casing body 130 may also contain moldings to place batteries or sensors or lighting fixtures.

FIG. 11 shows an inner support member 110 of the display apparatus 10. For the ease of description, the inner support member 110 may include a support panel 112 and an inner stand 120. The support panel 112 may define a shoulder section 114, a middle section 116 and a torso section 118. The support panel 112 may be connected to the inner stand 120 by any applicable or conventional connection means such as by gluing, inserting, fastening or any combination thereof. The inner stand 120 may be placed inside the outer casing body 130 on top of the bottom panel member 142 of an outer casing body 130. In another embodiment, the inner stand 120 may be configured to have the same or similar size of a bottom panel member 142 of the outer casing body 130, such that a bottom panel member 142 of an outer casing body 130 is replaced, and a sliding side panel member 136 or 138 fastened to the inner stand 120 when the display apparatus 100 is in a closed configuration. The shoulder section 114 of the support panel 112 defines a smooth round 115 outliner mimicking the contour of human shoulders. The shoulder section 114 may include a curved structure 111 capable of providing a supporting space for items having only shoulder straps, for example, a jersey with only shoulder straps and no short sleeves, such as those worn by basketball players. In addition, the shoulder section 114 of the support panel 112 may include a neck curve line 113 resembling a V shape that extends lower than most of jersey collar (except the jerseys with only should straps but no short sleeves) such that the support panel 112 is invisible when a jersey is worn. In the embodiment, middle section 116 of the support panel 112 is in a substantially inverted trapezoidal configuration, with the width of the top and the bottom of the trapezoidal configuration is slightly different, while the top width is such that the jersey 10 is fully expanded in the torso portion 16, and all of the lettering (e.g., individual's name on the back of the jersey), team logo, and autographs are clearly visible. The torso section 118 of the support panel 112 is in a substantially inverted trapezoidal configuration, with the width slightly smaller than the middle section 116 of the support panel 112, such that jerseys 10 with tightened bottom hem 18 is not over expanded. In other examples, the slight space between the support panel 112 and the bottom hem 18 of the jersey 10 avoids the rigidity and creates a floating effect.

The inner support member 110 is designed to not only to display jerseys of all sports, but any other object with a solid or semi-solid form, for example, books, paper ribbons, metal award, photos, autographs, trading cards, or any other items or documents that are intended to be displayed.

FIG. 12 shows an inner support member 110 of the display apparatus 10. The thickness of the support panel 112 of the inner support member 110 is to create distance between the front and the back fabric of a jersey 10 displayed to achieve a three-dimensional and mid-air floating vision effect.

Figure 13:
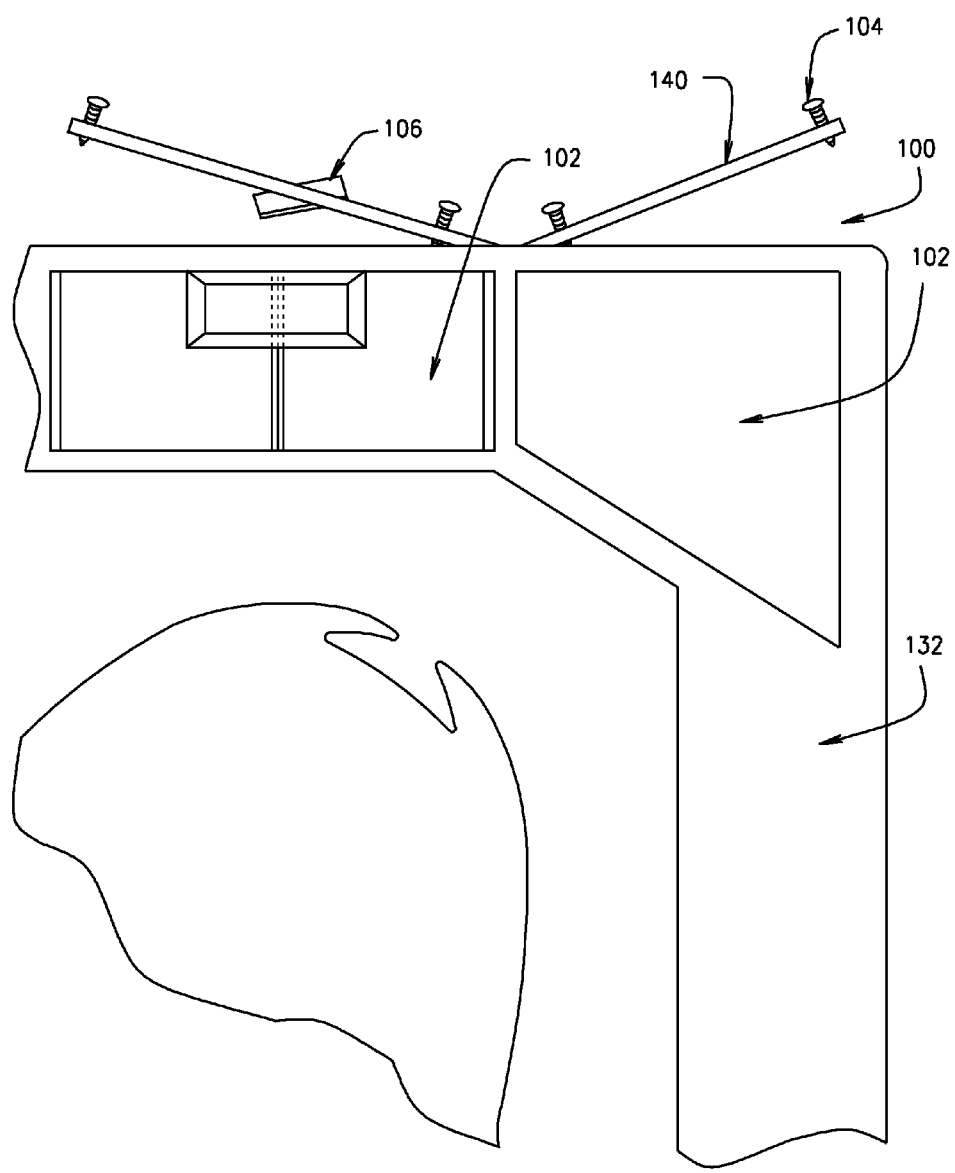
FIG. 13 is a front view of a layout of moldings for internal or surface components 102 placed in the outer casing body 130, and an enclosure means for those components.

FIG. 13 shows a layout of moldings for internal or surface components 102 placed in a space defined between a front frame 132 and a back frame 134 of an outer casing body 130. FIG. 13 also illustrates an example of an enclosure means using a top panel member 140 having fasteners 104 and one or more switchable clips 106.

Figure 14:
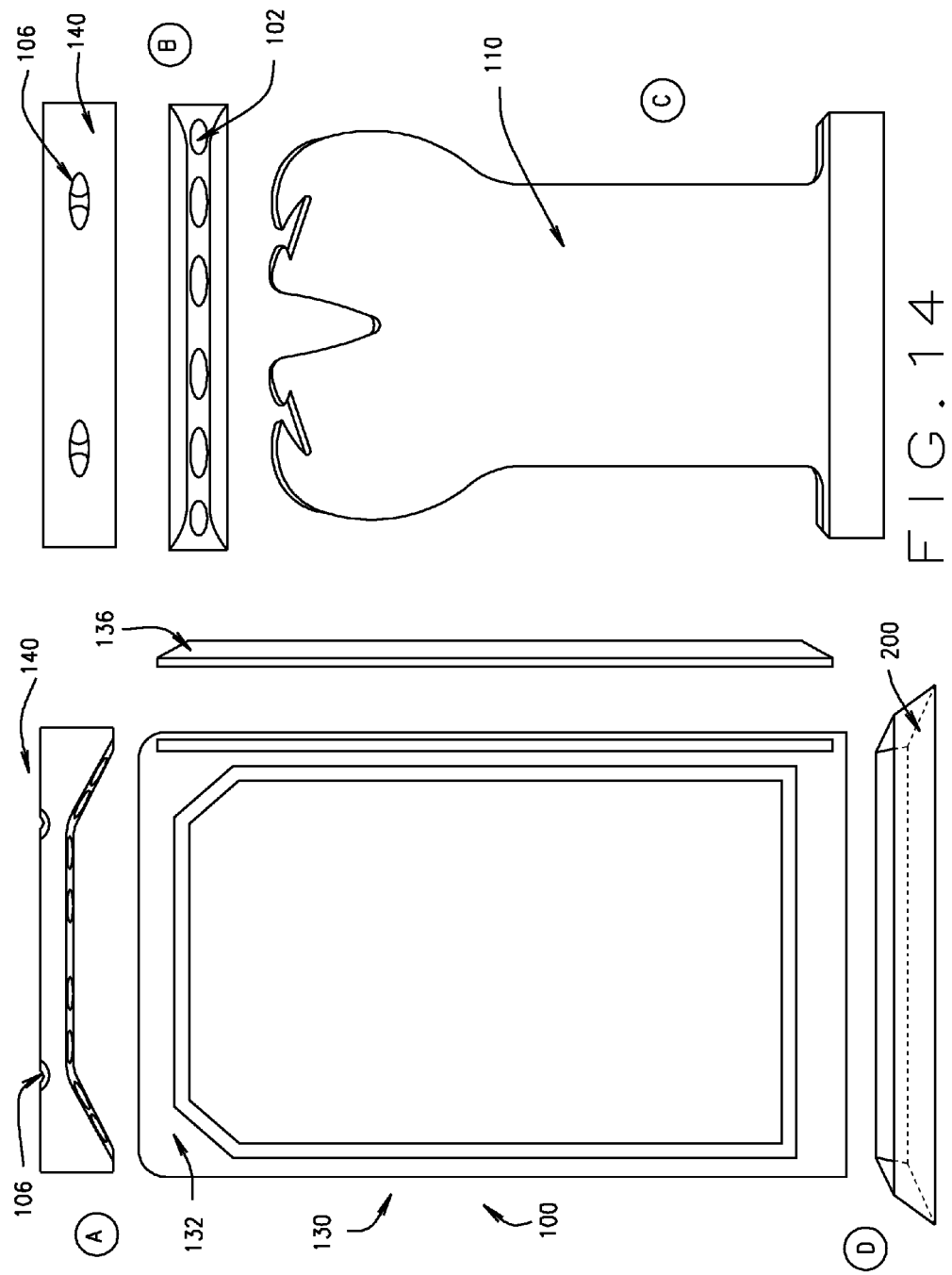
FIG. 14A is a front perspective view of the outer casing body 130 equipped with lighting fixtures on the upper part of the outer casing body.
FIG. 14B is the top view and the top under view of a top panel member 140 with lighting fixtures.
FIG. 14C is an inner support member 110 matching the display apparatus 100 and is ready to slide in through the opening.
FIG. 14D depicts another embodiment of an optional display apparatus desk support 200 having a groove fit for the bottom part of the outer casing body 130.

FIG. 14 illustrates a display apparatus 100 with internal or surface components 102 placed in a space defined between the front frame 132 and the back frame 134 of an outer casing body 130. FIG. 14A shows the outer casing body 130 equipped with lighting fixtures on the upper part of the outer casing body 130. The top and bottom view of a top panel member 140 with lighting fixtures are shown in FIG. 14B as an exemplary embodiment. FIG. 14A further depicts a display apparatus 100 in an open configuration with a sliding side panel 136 or 138 removed on the right side, and the inner support member 110 matching the display apparatus 100 is ready to slide in through the opening (FIG. 14C). FIG. 14D illustrates another embodiment of an optional display apparatus desk support 200 having a groove fit for the bottom part of the outer casing body 130. Therefore, the display apparatus 100 may be hung up on the wall, from ceiling, or it may stand alone or stand with its bottom part of the outer casing body 130 inserted in a display apparatus desk support 200.

Figure 15B:
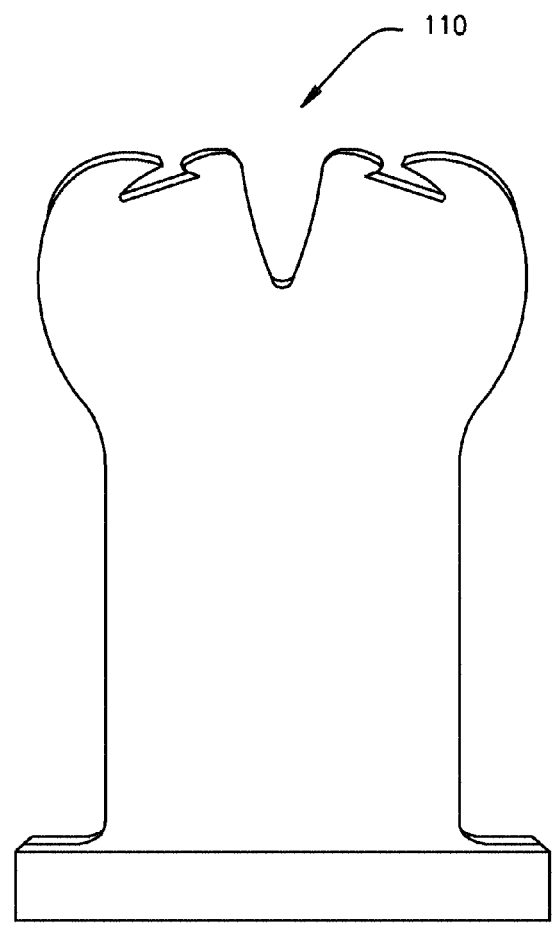

As can be appreciated, a display apparatus in accordance with the present invention can be made in any size appropriate for the item to be displayed. In another embodiment, a display apparatus 100 including the outer casing body 130, the front frame 132, the top panel member 140 with lighting fixtures are provided. FIG. 15A further includes the dimension and size of an optional display apparatus desk support 200 in one particular embodiment provided for exemplary purposes only. FIG. 15B provides for exemplary purposes the dimension and size of inner support member 110 that matches with the size of a display apparatus 100 as provided in FIG. 15A.

There has thus been shown and described a novel display apparatus which fulfills all the objects and advantages sought therefore. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A display apparatus for displaying an item, the display apparatus comprising:
   an outer casing body comprising a front frame, a back frame, two side panel members, a top panel member, a bottom panel member;
   a front clear screen and a back clear screen; wherein the front and the back clear screen is supported by the front frame and the back frame of the outer casing body, respectively;
   an inner support member configured to support the item for display within the outer casing body, the inner support member including a support panel and an inner stand, wherein the support panel is defined by a shoulder section, a middle section and a torso section; wherein the support panel is connected to the inner stand by a connection means; wherein the shoulder section of the support panel defines a smooth round outline substantially mimicking the contour of human shoulders; wherein the shoulder section further comprises a curved structure configured to provide a supporting space for items having only straps or strings to attach; wherein the support panel comprises a neck curve line resembling a V shape; wherein the middle section and torso section of the support panel are in an inverted trapezoidal configuration, and
   a hologram screen is integrated in a preselected position on the front clear screen, wherein the hologram screen is motion controlled by a sensor installed in the outer casing body.

2. The display apparatus of claim 1, wherein the outer casing body is made of a material selected from the group consisting of wood, acrylic, metal, plastic, clay material, and combinations thereof.

3. The display apparatus of claim 1, wherein the front clear screen and back clear screen are made of clear acrylic, glass, or plexi-glass sheets.

4. The display apparatus of claim 1, wherein the item is a jersey intended to be displayed within the display apparatus having the outer casing body.

5. The display apparatus of claim 4, wherein the outer casing body has a predetermined width, length, and depth sufficient to display a jersey with a size of 10%, 20%, 30%, 40%, 50%, 60%, 70%, 80%, 90%, 100%, 150%, 200%, 300%, 400%, or above, or any range thereof of the size of a real jersey.

6. The display apparatus of claim 1, wherein the middle section and torso section of the support panel have a predetermined width such that the jersey is fully expanded in the torso section, but is not over expanded in the torso section; wherein the support panel is invisible when the jersey displayed has a shoulder portion; wherein the inner support member provides a visual effect that the jersey is floating in mid-air in the display apparatus; wherein the support panel has a predetermined depth, sufficient to display the jersey in three dimensions.

7. The display apparatus of claim 1, wherein the outer casing body further comprises:
   an opening means comprising at least one of the two side panel members, wherein the at least one of the two side panel members is slidable in or out of the outer casing body to form a closed or an open state of the outer casing body; and
   a hanging means in the back frame and selected from a group consisting of a hole, a hook, a tack, a cleat, a tape, a wire, a string or any combination thereof for hanging the display apparatus.

8. The display apparatus of claim 1, the display apparatus further comprising:
   a display apparatus desk support comprising a base; and
   an inserting means comprising a space for the outer casing body to sit and be secured by the desk support; wherein the space is a groove recessed into the surface of the base, or an opening above the surface of the base created by at least a front piece and a back piece.

9. A display apparatus for displaying an item, the display apparatus comprising:
   an outer casing body comprising a front frame, a back frame, two side panel members, a top panel member, a bottom panel member; wherein the outer casing body further comprises: one or more internal or surface components in a top or a bottom space between the front frame and the back frame of the outer casing body; wherein the internal or surface component is selected from the group consisting of lighting fixtures, voice chip, speakers, projector, battery packs or an inlet for energy sources, motion sensors controlling the one or more internal or surface components thereof, and combinations thereof;
   a front clear screen and a back clear screen; wherein the front and the back clear screen is supported by the front frame and the back frame of the outer casing body, respectively;
   an inner support member configured to support the item for display within the outer casing body, the inner support member including a support panel and an inner stand, wherein the support panel is defined by a shoulder section, a middle section and a torso section; wherein the support panel is connected to the inner stand by a connection means; wherein the shoulder section of the support panel defines a smooth round outline substantially mimicking the contour of human shoulders; wherein the shoulder section further comprises a curved structure configured to provide a supporting space for items having only straps or strings to attach; wherein the support panel comprises a neck curve line resembling a V shape; wherein the middle section and torso section of the support panel are in an inverted trapezoidal configuration;
   a hologram screen is integrated in a preselected position on the front clear screen, wherein the hologram screen is motion controlled by a sensor installed in the outer casing body.

10. The display apparatus of claim 9, wherein the projector includes a camera placed inside the bottom space between the front frame and the back frame of the outer casing body, such that an image can be projected onto the inside of the front clear screen.

11. The display apparatus of claim 9, wherein the front clear screen is made of plexi-glass.

12. A display apparatus for displaying an item, the display apparatus comprising:
- an outer casing body comprising a front frame, a back frame, two side panel members, a top panel member, a bottom panel member; wherein the outer casing body further comprises: one or more internal or surface components in a top or a bottom space between the front frame and the back frame of the outer casing body; wherein the internal or surface component is selected from the group consisting of lighting fixtures, voice chip, speakers, hologram screen, projector, battery packs or an inlet for energy sources, motion sensors controlling the one or more internal or surface components thereof, and combinations thereof;
- a front clear screen and a back clear screen; wherein the front and the back clear screen is supported by the front frame and the back frame of the outer casing body, respectively;
- an inner support member configured to support the item for display within the outer casing body, the inner support member including a support panel and an inner stand, wherein the support panel is defined by a shoulder section, a middle section and a torso section; wherein the support panel is connected to the inner stand by a connection means; wherein the shoulder section of the support panel defines a smooth round outline substantially mimicking the contour of human shoulders; wherein the shoulder section further comprises a curved structure configured to provide a supporting space for items having only straps or strings to attach; wherein the support panel comprises a neck curve line resembling a V shape; wherein the middle section and torso section of the support panel are in an inverted trapezoidal configuration;
- a removable display apparatus desk support comprising a base; and
- an inserting means comprising a space for the outer casing body to sit and be secured by the desk support; wherein the space is a groove recessed into the surface of the base, or an opening above the surface of the base created by at least a front piece and a back piece.

* * * * *